(12) United States Patent
Salemann

(10) Patent No.: US 8,190,585 B2
(45) Date of Patent: May 29, 2012

(54) SUPPORTING MULTIPLE DIFFERENT APPLICATIONS HAVING DIFFERENT DATA NEEDS USING A VOXEL DATABASE

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 191 days.

(21) Appl. No.: 12/707,231

(22) Filed: Feb. 17, 2010

(65) Prior Publication Data

US 2011/0202510 A1 Aug. 18, 2011

(51) Int. Cl.
*G06F 17/00* (2006.01)
(52) U.S. Cl. ........ 707/693; 707/723; 707/769; 707/802; 345/424
(58) Field of Classification Search .................. 707/693, 707/723, 769, 802; 345/424
See application file for complete search history.

(56) References Cited

U.S. PATENT DOCUMENTS 6,377,229 B1 * 4/2002 Sullivan ............................ 345/6

FOREIGN PATENT DOCUMENTS

WO WO 88/02156 * 3/1988

OTHER PUBLICATIONS

Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.

Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~tpollard/pollard_mundy_cypr07.pdf>.

Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.

Gebhardt, S., et al., "Polygons, point clouds, and voxels, a comparison of high-fidelity terrain representations," 2009 SIWZIE Awards, Simulation Interoperability Standards Organization, Nov. 20, 2009.

* cited by examiner

*Primary Examiner* — Shahid Alam
*Assistant Examiner* — Jagdish Pandya
(74) *Attorney, Agent, or Firm* — Patents on Demand, P.A.; Brian K. Buchheit

(57) ABSTRACT

A system can include a voxel database and the set of applications. The voxel database can include a set of voxel indexed records, wherein the voxel database manages a volumetric storage space corresponding to a real-world volumetric space, where units of real-world volumetric space and data specific to these units map to voxels and attributes of voxel indexed records. Each of the applications can include a user interface that renders a volumetric simulation space that corresponds to the volumetric storage space. Geospatial data for the simulation space can include visual attributes used to render a graphical user interface representation of the simulation space, where these visual attributes are acquired from the voxel database. The applications can have different geospatial formatting and content needs from each other, yet the content needs of each of the applications can be supported by the voxel database.

22 Claims, 9 Drawing Sheets

Embodiment 250

Simulation Device 210 
Hardware 212
Computer Program Product 220
- User Interface 222
- Voxel Engine 223
- Device Drivers 224
- Behavior Engine
- SAF Application 170

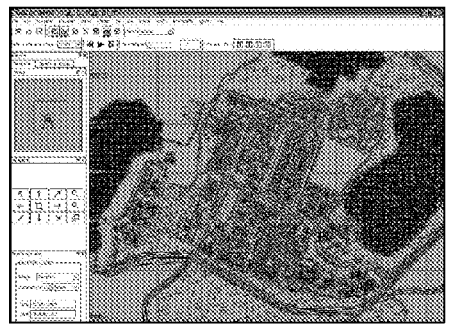

Embodiment 252

Simulation Device 210 
Hardware 212
- Environmental Sensor
- Movement Detector
- Visual Display
- Speaker
- Movement Output Device
- Tactile Output Device
- Odor Output Device
- Taste Output Device
- Thermal Output Device
- Humidity Output Device
- Wind Output Device

Computer Program Product 220

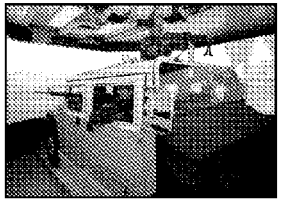
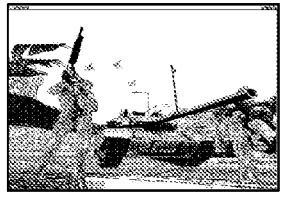

Embodiment 254

Simulation Device 210 
Hardware 212
Computer Program Product 220
- User Interface 106
- Voxel Engine 167
- Simulation Application 170
- Behavior Modeler
- Inference Engine 256 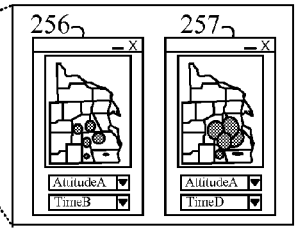  257 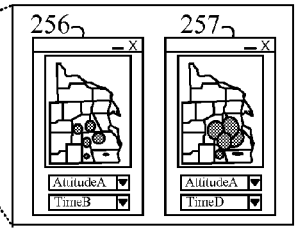

FIG. 2B

Voxel Table 610

| VID | SID | SAttri1_Lower | SAttri1_Upper | SAttri2_Lower | SAttri2_Upper ... |
|---|---|---|---|---|---|
| 1 | 1 | M1L VAL | M1U VAL | M2L VAL | M2U VAL |
| 2 | 1 | N1L VAL | N1U VAL | N2L VAL | N2U VAL |
| 3 | 2 | O1L VAL | O1U VAL | O2L VAL | O2U VAL |
| 4 | 3 | P1L VAL | P1U VAL | P2L VAL | P2U VAL |
| 5 | 3 | Q1L VAL | Q1U VAL | Q2L VAL | Q2U VAL |

Shape 3D Table

| SID | FID | Type | X | Y | Z | * | * | * | * |
|---|---|---|---|---|---|---|---|---|---|
| 1 | 1 | Box | * | * | * | * | * | * | * |
| 2 | 2 | *Box* | * | * | * | * | * | * | * |
| 3 | 2 | *Box* | * | * | * | * | * | * | * |
| 4 | 2 | *Box* | * | * | * | * | * | * | * |
| 5 | 3 | Box | * | * | * | * | * | * | * |
| 6 | 4 | Cylinder | * | * | * | * | * | * | * |
| 7 | 4 | Cylinder | * | * | * | * | * | * | * |
| 8 | 4 | Cylinder | * | * | * | * | * | * | * |
| 9 | 4 | Cylinder | * | * | * | * | * | * | * |
| 10 | 5 | Cylinder | * | * | * | * | * | * | * |
| 11 | 5 | Cylinder | * | * | * | * | * | * | * |

Building Feature Table

| FID | Name | Address | * | * | * |
|---|---|---|---|---|---|
| 1 | RI Hospital Trust | 123 4th St | * | * | * |
| 2 | *Kennedy Plaza* | *567 8th Ave* | * | * | * |
| 3 | Webster Bank | 91011 th Pl | * | * | * |

Tree-Grove Feature Table

| FID | Name | Genus | * | * | * |
|---|---|---|---|---|---|
| 4 | Kennedy Park | Conifer | * | * | * |
| 5 | Market Square | Deciduous | * | * | * |
| 99 | Specific Attr | Specific Attr | * | * | * |
| 199 | Specific Attr | Specific Attr | * | * | * |
| 999 | Specific Attr | Specific Attr | * | * | * |

FIG. 6

SUPPORTING MULTIPLE DIFFERENT APPLICATIONS HAVING DIFFERENT DATA NEEDS USING A VOXEL DATABASE

BACKGROUND

The present disclosure relates to the field of spatial referenced information, three dimensional virtual environments, and voxel databases systems and, more particularly, to supporting multiple different applications having different data needs from a voxel database.

Complexity of three dimensional virtual environments, such as a simulation environment, has grown exponentially in correspondence with the growth of simulation technologies. Simulated environments include computer based simulators, immersion simulators, and device assisted real-world simulations (Tactical Engagement Simulation (TES) systems, for example). Many of these simulators are designed to model real world scenarios, which require geospatial correspondence between a real world space and a simulation space. For instance, to successfully implement military personnel trainers, military intelligence analysis systems, mission rehearsal systems, and unmanned military systems, a simulation space must accurately reflect a geographic region being modeled.

Acquiring, and implementing geospatially correct information for simulated environments becomes increasingly difficult as the complexity of output modes involved in a simulation increase. For example, many flight combat simulation environments not only provide a human with images seen out of a simulated cockpit view screen, but present data on simulated radar screens, thermal imaging screens, and other simulation equipped instrumentation. Output presented on each of these mechanisms change based upon user-controlled decisions. All of these output mechanisms provide divergent data, which must be synchronized with one another, often in real-time.

Current simulation systems have multiple stove-piped storage repositories, each of which are specifically used to support a single simulation product. Current information handling techniques and customized needs of end-products often necessitate this redundancy, which is extremely costly in terms of storage space and man hours. Use of multiple different stove-piped repositories also introduces multiple areas of potential failure and risk in the area of terrain correlation.

FIG. 1A (Prior Art) shows a pictorial representation of the current situation for providing simulators with geospatial data. Specifically, earth measurements are taken and processed through product specific channels to generate a set of source products 192. A sub-set of each of these products 192 is used to produce a model data set 194, which drives a specific type of simulation interface 196. This process can take months and results in discrete simulator modules/products, which are not inherently correlated to each other.

BRIEF SUMMARY

The disclosure provides a voxel-based query system for a voxel database that allows a single terrain representation (e.g., a voxel database) to serve live, virtual, and constructive simulation. That is, all information required for live, virtual, and constructive simulations (e.g., visual appearance, material type, traversability, etc.) is stored in a single volumetric representation. A set of simulator-specific queries can extract information needed for visualization versus constructive simulation versus sensor simulation. The various simulators that use the voxel database data can include vector based simulators and voxel based simulators. The voxel-based query system can be extendible, where different simulator specific plug-ins can be created, which adapt the voxel database information as needed. Advantageously, a query system that only requires a single terrain representation can reduce terrain generation time and expense, and can guarantee terrain correlation. The disclosure is not strictly limited to simulators, but can function with any type of application that is supplied information from a voxel database.

One aspect of the disclosure is for a system for centrally managing geospatial data used by a set of applications. The system can include a voxel database and the set of applications. The voxel database can include a set of voxel indexed records, wherein the voxel database manages a volumetric storage space corresponding to a real-world volumetric space, where units of real-world volumetric space and data specific to these units map to voxels and attributes of voxel indexed records. Each of the applications can include a user interface that renders a volumetric simulation space that corresponds to the volumetric storage space. Geospatial data for the simulation space can include visual attributes used to render a graphical user interface representation of the simulation space, where these visual attributes are acquired from the voxel database. The simulators can have different geospatial formatting and content needs from each other, yet the content needs of each of the applications can be supported by the voxel database.

In one embodiment, a voxel database can be populated with geospatial data correlated to a real-world volumetric space obtained from a set of different sources. The voxel database can include a set of voxel records, each voxel record having a unique voxel identifier, which represents a volumetric storage unit corresponding to a real-world volumetric space. A multitude of information requests can be received from different applications. For each information request, a volumetric sub-region of the volumetric storage space can be determined. A set of voxel-related and voxel database stored attributes relevant for the information request can be ascertained. The voxel database can be queried to obtain a query response data set that includes voxel database stored values for the set of voxel-related attributes of the determined volumetric sub-region. The query response data set can be converted to application specific information encoding format. The converted response data set can be conveyed to the applications from which the information request was received. The converted response data set can include geospatially correlated information needed by the applications to represent a simulation space within a user interface. The simulation space corresponds to a volume of the real-world volumetric space that is associated with the sub-region of the volumetric storage space.

In one embodiment, a set of sensors can capture raw data that geospatially corresponds to a real world volumetric space. The raw data can include point cloud data encoded in a light detecting and ranging (LiDAR) information format, imagery and video data, and elevation data encoded in a digital elevation model (DEM) or digital surface model (DSM) format. The raw data can be stored and fused in a voxel database such that each voxel in the voxel database represents a combination of volumetrically stored data for all source products that includes products providing point cloud data, imagery and video data, and elevation data. The voxel database can receive requests from a set of different applications. One of the applications can be a live simulator application. One of the applications can be a virtual simulator application. One of the applications can be a constructive simulator application. For each received request, an application specific plug-in can be determined. The application specific plug-in can execute to convert the voxel database data into an application specific format. The converted voxel database data can be converted to the request issuing application.

BRIEF DESCRIPTION OF THE SEVERAL VIEWS OF THE DRAWINGS

FIG. 2B shows a set of embodiments for different applications supported by the voxel database in accordance with an embodiment of the disclosure.

FIG. 6 illustrates a set of tables for a voxel GIS in accordance with an embodiment of the disclosure.

DETAILED DESCRIPTION

Figure 1A:
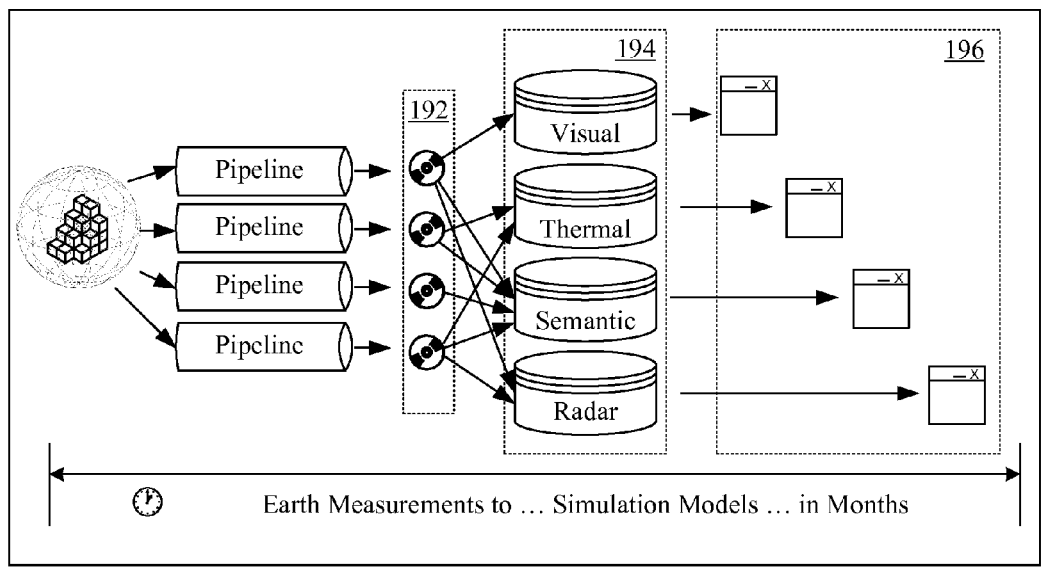
FIG. 1A (Prior Art) shows an end-to-end process for acquiring raw data to generating applications or components in accordance with an embodiment of the disclosure.

The disclosure provides a volumetric storage space 120 of a voxel database, that supports multiple different simulators. The volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space 120. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot. Probabilities can also apply to social characteristics and cultural conditions determined by processing data of the volumetric storage space 120.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records. Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database—visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

Figure 1B:
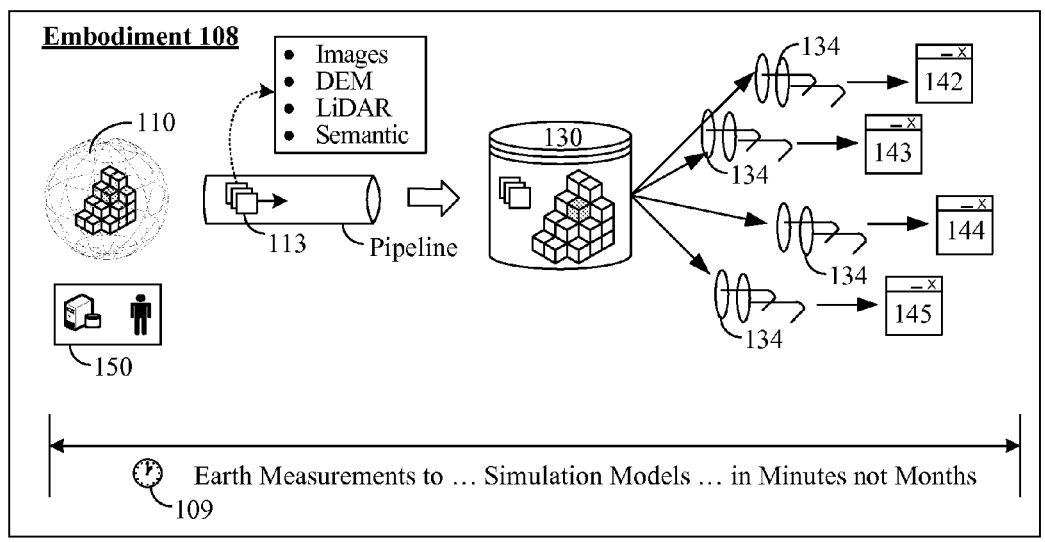
FIG. 1B shows an end-to-end process for acquiring raw data to storing it in a central voxel database to generating applications or components in accordance with an embodiment of the disclosure.

Embodiment 108 of FIG. 1B provides a description for populating and using voxel database 130. In embodiment 108, data 113 captured from a real-world volumetric space 110 can be conveyed over a single pipeline to a voxel database 130. The data 113 can come from many sources 150, such as satellite imagery, digital elevation model (DEM) data, video, SIGINT, HUMINT, and the like. Additionally, the filtered (134) voxel database 130 can provide data for multiple different types of simulators, which include constructive, virtual, and live simulators. For example, assuming the simulators all include terrain models for a real-world volumetric space 110, immersion simulators 142, constructive simulators 143, live simulators 144, and virtual simulators 145 can all be generated from voxel database 130 stored records. In one embodiment, different simulation components, such as a radar component, a terminal imaging component, and a visual component for a single simulator can be generated from the voxel database 130. These different components, since they are derived from a single geospatially correlated source 130, are geospatially correlated to each other.

It should be appreciated that embodiment 108 can be largely automated, which permits the process 109 from taking measurements, to producing simulation models to occur within minutes and not months, as is the case with conventional information gathering and modeling processes.

Figure 1C:
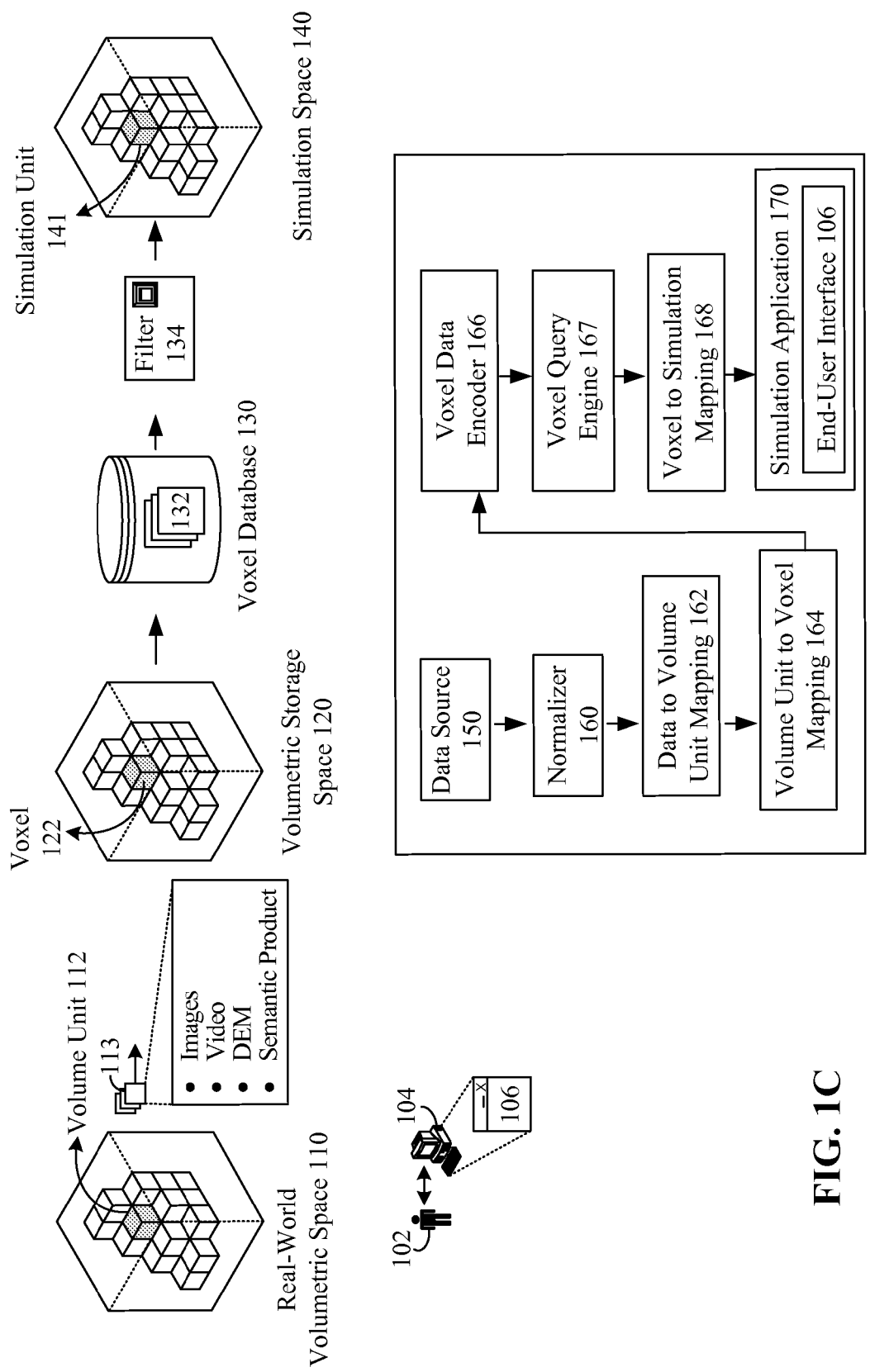
FIG. 1C is a schematic diagram showing a voxel database for supporting a set of different applications in accordance with an embodiment of the disclosure.

FIG. 1C is a schematic diagram for a voxel database 130 that is a central repository for multiple simulators in accordance with an embodiment of the inventive arrangements disclosed herein.

The voxel database 130 is a storage mechanism for a volumetric storage space 120, which is a three dimensional space formed from a plurality of volumetric units, which are voxels 122. A volumetric unit 112 of real-world space 110 can be directly mapped to a voxel unit 122 of volumetric storage space 120. The mappings need not be one-to-one, as may be the case for an embodiment that uses gridded voxel encoding. For example, in an embodiment where sparse voxel encoding is used by database 130, a one-to-zero mapping from space 110 to volumetric storage space 120 will occur. Similarly, in an embodiment where octree voxel encoding is used by database 130, a many-to-one mapping from space 110 to volumetric storage space 120 will occur. Regardless of specific encoding schemes used by voxel database 130, conceptually a one-to-one mapping between real-world volumetric space 110 and volumetric storage space 120 can exist (which physical or functional encoding techniques may not necessarily conform to this one-to-one mapping).

Likewise, a volumetric simulation space 140 can be directly mapped to the volumetric storage space 120, in a conceptual unit-by-unit manner (simulation units 141 can map to voxels 122). The simulation space 140 can be visually and interactively presented to a user 102 within a simulation end-user interface 106 of a computer device 104. In one embodiment, a set of filters 134 can be used to transform data of database 130 to a form desired by a specific simulator, which can be a raster-based form, a vector based form, or combinations thereof.

The voxel database 130, which manages records 132 defining the volumetric storage space 120, can receive many different types of data 113 from different data sources. Specifically, imagery, elevation, point cloud, and other information types can be received, processed, and stored in the voxel database 130. The imagery data can include geospatial images and/or video. The elevation data can include digital elevation model (DEM) and/or digital surface model (DSM) data. The point cloud data can include light detecting and ranging (LiDAR) information. The other types of information can include data for a set of geospatially aligned vector datum and/or vector layers, such as road centerlines, water areas, and building footprints. The other types of information can also include semantic information, weather information, material composition information, texture information, and the like.

When the data 113 is placed in the voxel database 130 it is fused together, such that each voxel 122 represents a combination of all source products received up to that point in time. The combination (fusion) of data into specific voxel units 122 can be based on a summation, an averaging, or other statistical algorithm.

Turning to the end-to-end process, data sources 150 can utilize a set of sensors to capture and record data 113 for a specific volume unit 112. The data 113 can include images, video, unmanned vehicle feeds, signals intelligence (SIGINT) information, human intelligence (HUMINT) data, and the like. Semantic content of the data 113 can include weather, visual appearance, elevation, temperature, humidity, terrain composition, civilian density and location, force density and location, and other definable attributes of volume unit 112 and/or objects within volume unit 112.

Before converting data 113 into voxel 122 mapped records 132, the data 113 can be optionally normalized (by normalize 160) to a definable standard. A data to volume mapping unit 162 can determine which unit 112 data 113 elements correspond to. Then, volume unit to voxel mapping component 164 can determine which voxel 122 corresponds to which volume unit 112. The voxel database 130 can be associated with a voxel query engine 167, which permits records 132 to be retrieved based on requestor supplied criteria. Voxel data encoder 166 can digitally encode the data 113 into a voxel database 130 format. In one embodiment, a set of optional filters 134 can be established between the voxel database 130 and a related simulation space 140. A voxel to simulation mapping component 168 can map voxels to specific simulation units 141 of simulation space. Simulation space 140 data can be presented in end-user interfaces 106 of simulators 170.

Figure 2A:
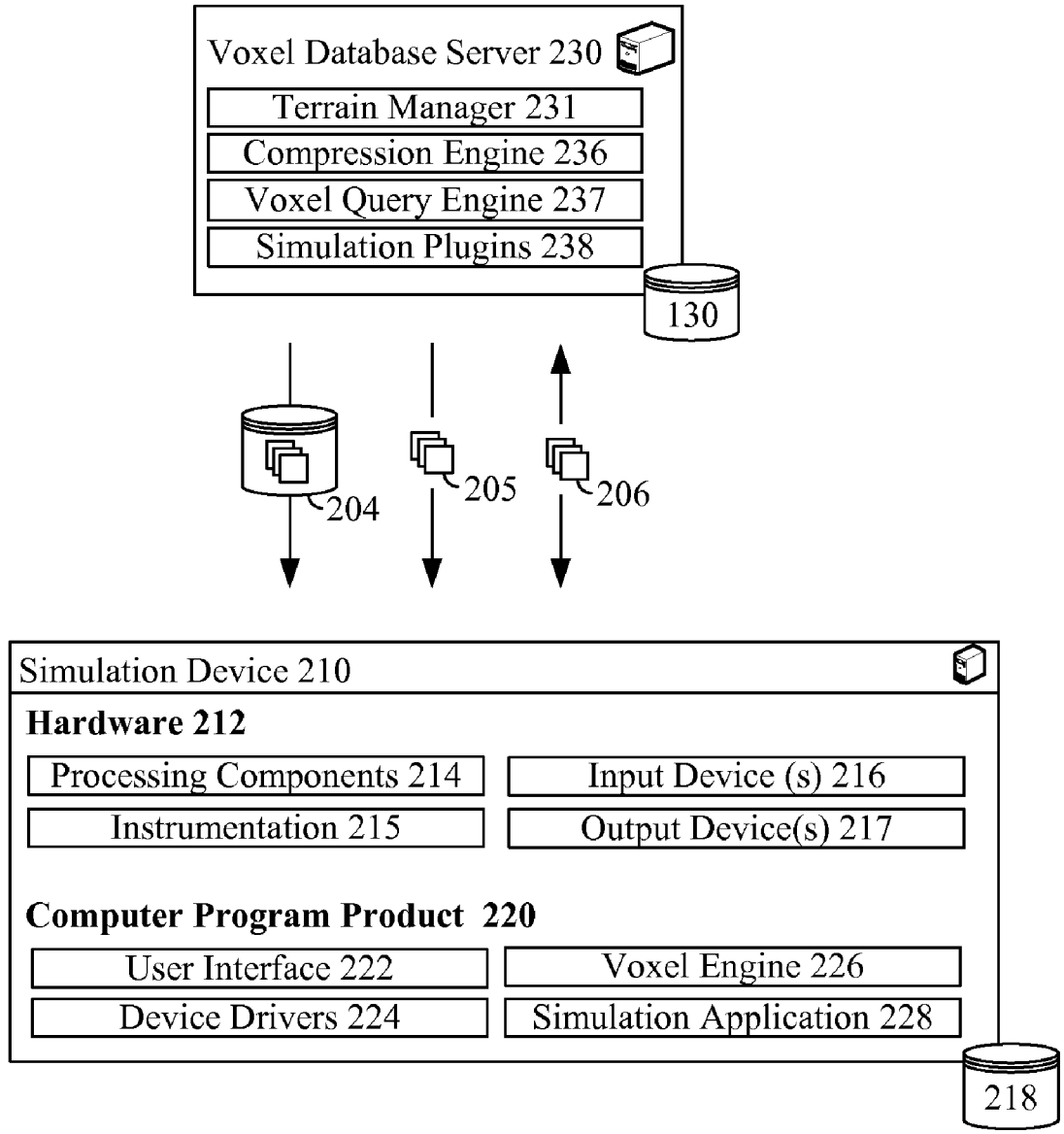
FIG. 2A shows a relationship between a voxel database server and a computing device in accordance with an embodiment of the disclosure.

FIG. 2A shows a diagram of a voxel database server 230 providing information to simulation device 210 in accordance with an embodiment of the disclosure. The voxel database server 230 can be a server providing specific functions for the voxel database 130. Many different simulation devices 210 can be served from the common repository 130. Data feeds from server 230 to simulation device(s) 210 can be unidirectional (204, 205) or bidirectional (206) and can be time delayed (204, 205) or real-time (which includes near-real-time) 206. The voxel database server 230 can be a central server supporting a set of different simulation devices 210, each having different geospatial formatting and content needs.

In one embodiment, the server 230 can utilize a voxel query engine 237 and a set of plug-ins 238 specific to device 210 to generate a simulator specific model 204. This model 204 can be in a voxel (or volumetric raster) based format, when conveyed to a simulation device 210 having a voxel engine 226. The model 204 can also be in a vector format, which is converted by server 230 specifically for use by a particular type of simulation device 210. A model 204 can contain all the information needed by simulation device 210 and need only be generated and conveyed from the server 230 to the device 210 once. Thus, once a simulation device 210 receives a model 204 the device 210 can execute the application 170 when in a network disconnected state.

In one embodiment, a feed of a set of data 205 can be continuously and/or intermittent to a simulation device 210. For example, a region-specific data set 205 can be provided to simulation device 210, which can be updated from database server 230 whenever the simulator is to include terrain from a different region. Code of the simulation application 170 can trigger events, which result in an acquisition and loading of new data sets 205.

In one embodiment, voxel database data 206 can be streamed from the voxel database server 230 in real time. This permits live data provided by server 230 to be immediately consumed by a set of simulation devices 210.

In different embodiments, the voxel database 130 can store information in a homogeneous form or a heterogeneous form. A heterogeneous form can be useful when different types of geospatial data are to be highly compressed (by compression engine 236), since different semantic based compression techniques apply to different types of content.

A simulation device 210 can be device for presenting simulation space 140 data, which can occur in a user interactive fashion. Simulation devices 210 can vary greatly in terms of hardware 212 and computer program products 220 used, which causes user interfaces 222 to vary accordingly. For example, different simulators supported by server 230 can include semi-autonomous force simulators, tactical engagement simulators, immersion simulators, and live simulators.

The hardware 212 of device 210 can include a number of components 214-218. Processing components 214 of the hardware 212 can include one or more microprocessors, memory 218, a bus, network cards, and the like. Instrumentation 215 can include radar displays, altimeters, speedometers, and other buttons and gauges. Input devices 216 can include a keyboard, mouse, touch screen, joystick, cameras, movement detectors, pressure sensors, temperature sensors, laser sensors (e.g., Multiple Integrated Laser Engagement System (MILES) compliant ones) and the like. The output devices 217 can include visual displays, audio speakers, and/or other sensory output devices (e.g., somatosensory output devices, olfaction output devices, gustation output devices, etc.).

The computer program products 220 of the simulation device 210 can include user interface 222, voxel engine 226, simulation application 228, device drivers 224, and the like. The device drivers 224 can facilitate communications between an operating system (not shown, but is one contemplated computer program product 220) and a specific hardware (such as devices 214-218).

Voxel engine 226 can be an engine able to consume data of the voxel database 130. In one embodiment, the engine 226 can process a set of voxels 122 or a portion of voxel space 120 consisting of any number of voxels. The voxel engine 226 can generate terrain features for a simulation space 140. That is, engine 226 can include a graphics engine that is voxel-based (as opposed to being vector based). Engine 226 can also directly consume voxel-mapped semantic data, which can be presented upon a visually rendered map or within illustrated terrain. In one embodiment, the voxel engine 226 can handle uncertainty and can inherently be probabilistic in nature. In one embodiment, raw (possibly filtered via filter) voxel data can be used to render video and to produce other model (non-visual) output using output devices 217.

Simulation application 170 can include any executable program that utilizes geospatial data of the voxel database 130. The user interface 222 can be a part of the application 170 code and/or can be a front-end for the application 170 code. In various embodiments, simulation application 170 can include an immersion simulation application, a constructive simulation application, a real-world simulation used by intelligence analysts, and the like.

Embodiment 250 of FIG. 2B shows a device 210 configuration for a semi-autonomous forces simulator, which can also be referred to as a constructive simulator. A semi-automated force application 170 (SAF) can use computer-generated forces (CGF) that react in a manner similar to real forces using computer models that determine decision making aspects of the simulated force entities. That is, the simulated force entities are programmed with the doctrine and behavior associated with a corresponding real-world entity being simulated, so that during an exercise, they move and react in a realistic manner over a simulation space 140. The simulation space 140 can be a geo-specific synthetic environment of a battlefield, generated from digital mapping data of database 130. SAF applications 170 and components can require highly complex terrain representations (e.g., Synthetic Natural Environments (SNE) or Terrain Database (TDB)) in order to operate.

In various embodiments, the SAF application 170 can be an entity-level constructive simulation or an aggregate-level constructive simulation. In entity-level constructive simulations, the simulated force entity can be a soldier, a tank, a plane, etc. In aggregate-level constructive simulations, an entity can be a patrol, squadron, company, brigade, etc. The SAF applications 170 can conform to a variety of known standards. Different embodiments of the SAF applications 170 include, but are not limited to, a Modular Semi-Automated Forces (ModSAF) embodiment, a Joint Semi-Automated Forces (JSAF) embodiment, a One Semi-Automated Forces (OneSAF) embodiment, a Warfighters' Simulation (WARSIM) embodiment, a Joint Conflict and Tactical Simulation (JCATS) embodiment, a brigade and battalion simulation (BBS) embodiment, and the like. Whether SAF application 170 is fully compliant with a known standard or not, it can and can leverage technologies utilized by different existing embodiments (e.g., ModSAF, JSAF, OneSAF, etc.) to perform the functions detailed herein.

Embodiment 252 of FIG. 2B shows a device 210 configuration for an immersion simulator or a virtual simulator. In embodiment 252, any of a variety of different simulation applications 170 can run. For example, in various embodiments, a simulation application 170 can include a surface ship training system, a combat leadership environment (CLE) system, a cockpit demonstrator, a flight simulator, an incident management system, a deployable training environment, a modular open architecture simulation services infrastructure compliant application, a reconfigurable vehicle simulator (CCTT-RVS), a synthetic environment (SE) core compliant application, a high-mobility multipurpose wheeled vehicle (HMMWV), a heavy expanded mobility tactical truck (HEMTT), a Bradley fire support vehicle (BFIST) virtual simulator, a tactical engagement simulation (TES), a tactical vehicle system, and the like. The simulator embodiments are for illustrative purposes only and are not to be construed as limiting the disclosure.

Hardware 212 of embodiment 252 shows many different input/output devices, which permit a simulator 210 to concurrently provide sensory data for multiple senses. Additionally, this sensory information can be geospatially accurate and/or related to a real-world volumetric space 110, which is being emulated by the simulation space 140 using volumetric storage space 120 maintained data. Not all simulation devices 210 need implement these extra sensory input/output devices, but embodiments are contemplated where one or more of them are present.

As shown in embodiment 252, input devices 216 can include environmental sensors and movement detectors. Environmental sensors can include cameras, pressure sensors, temperature sensors, laser sensors, and the like. The environmental sensors can be human worn, vehicle attached, or sensors for detecting dynamic occurrences of a sensor laden environment. Movement detectors can include accelerometer, gyroscopic, beam breaking, and other such sensors.

Output devices 217 can include visual display, speaker, movement output devices, odor output devices, taste output devices, thermal output devices, humidity output devices, wind output devices, and combinations thereof. Movement output devices can produce user-experienced motion. Movement devices can affect an environment proximate to a user (e.g., floor, door, etc. moving in a simulation environment). Movement devices can also be directly coupled to a user and/or device (e.g., simulated cockpit or seat) to which the user is attached.

Tactile output devices can include peripherals that exist to permit blind people to read Braille, to vibrate (e.g., vibrating game consoles), to resist motion (e.g., force response joysticks), and to generate other touch sensitive responses. Different materials, such as inflatable materials, can automatically adjust their firmness/hardness by inflating. Further, adding various liquids to a material can cause that material to have a slicker or rougher feel.

Odor output devices can generate output that stimulates a human's olfactory sense. For example, an odor output device can be a computer peripheral that includes a scent cartridge that contains a set of primary odors. Taste output devices can generate a particular taste. The taste can be extracted within a generated mist or within an edible strip ejected from a peripheral. Different artificial flavors and texture components can be stored within refillable cartridges of the taste output device.

Thermal output device can generate heat and/or cold to a desired level. Heater and air conditioning technologies can be used for thermal output devices. The humidity output device can change an amount of water vapor in the air to a desired level. Humidity output devices can include misting devices, humidifiers, dehumidifiers, and the like. Wind output devices can change user experienced air pressure. Fans and air flow inhibiting devices can be used as wind output devices.

Embodiment 254 of FIG. 2B shows a device 210 configuration for simulator for modeling behavior of culturally linked populations. Embodiment 254 emphasizes the diversity of application for the content stored in central voxel database 130. That is, simulators that utilize voxel database 130 data extend beyond simulators providing terrain modeling, and can include any of a variety of simulators that utilize geospatially stored information.

The simulation device 210 of embodiment 254 manages spatially referenced behavioral data for a simulated population. Records 132 of the voxel database 130 can be consumed by behavior modeler 168 to construct a behavioral model for a simulated population of simulation space 140. Similarly, attitudes, beliefs, ideas, and other social characteristics can be associated with specific people of the simulated population. Various cultural conditions can be defined for populations and geospatial regions that affect a propagation of social characteristics among people and groups. Thus, one set of region specific social characteristics can be present at a first time (as shown by screen 256), where another set of region specific social characteristics can be present at a different time (as shown by screen 257).

Figure 3A:
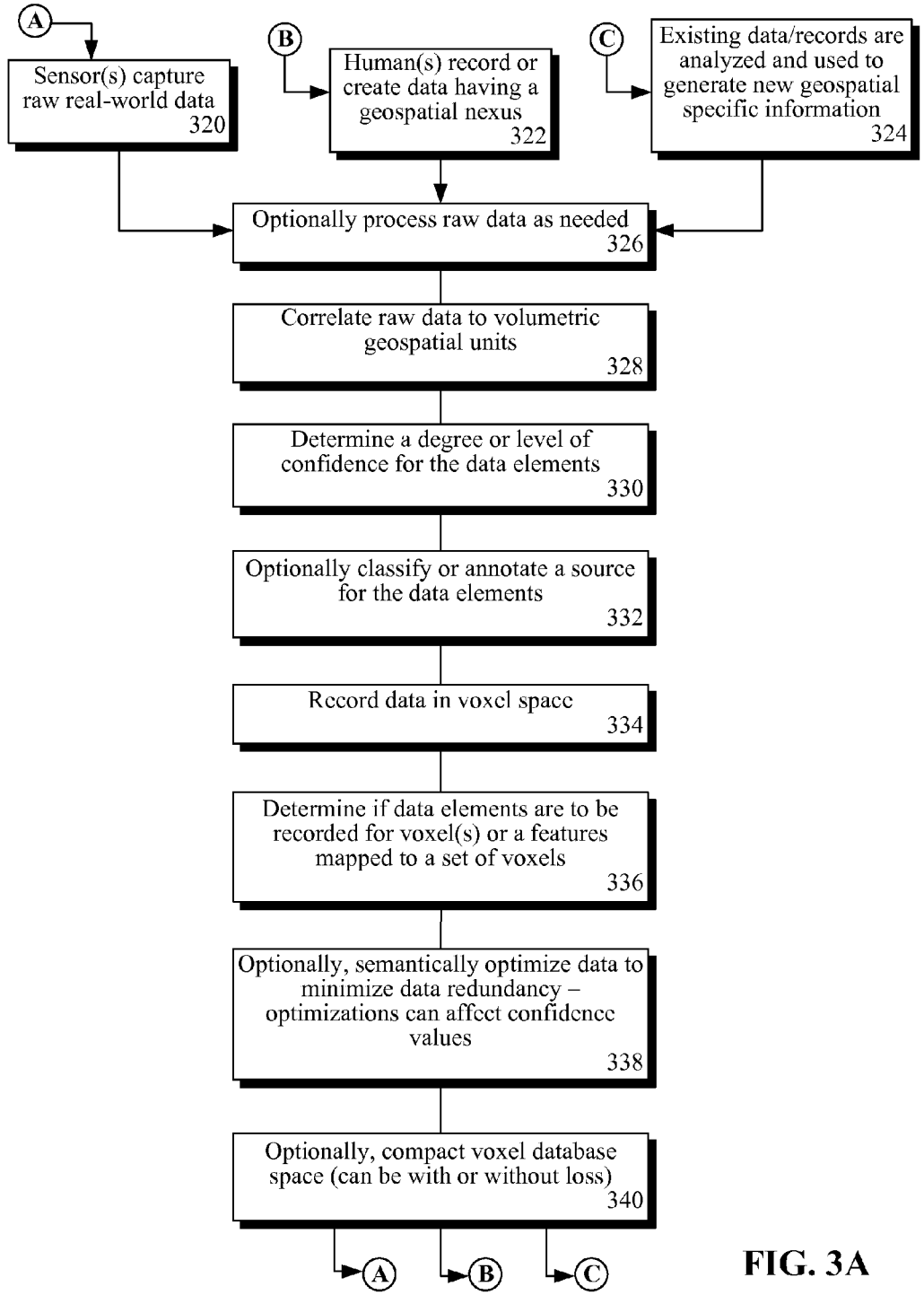
FIG. 3A is a flow chart of a process to acquire voxel database information from a data source in accordance with an embodiment of disclosure.

FIG. 3A shows a process 310 to acquire voxel database 130 information from a data source 150 in accordance with an embodiment of disclosure. In process 310 data can be continuously received from a variety of sources, which include completely automated data capture sources (step 320), human data sources (step 322), and generating new intelligence data (or other information) by analyzing and combining existing source data (step 324). This data can be continuously handled by the process, as represented by process 310 proceeding from step 340 to steps 320, 322, and/or 324. In process 310, data acquisitions and processes can occur in real-time or after an appreciable delay (e.g., handled in batch) depending upon implementation choices. Further, process 310 actions can occur asynchronously/synchronously as well as cyclically/randomly/based on conditional events depending on contemplated implementation choices.

Regardless of how raw data is gathered (step 320, 322, or 324), the data can be optionally processed as needed, as shown by step 326. In step 328, the raw data can be correlated to volumetric geospatial units and/or to populations present in the units. For example, data can be mapped to absolute or relative points in geographic space.

In step 330, a degree or level of confidence for the mapped data elements can be determined. In optional step 332, data elements can be classified in accordance to a source type and/or a specific data source can be tagged or otherwise related to the data elements.

The data elements can be recorded in voxel space meaning the data elements can be encoded into a voxel database, as shown by step 334. The voxel database can optionally establish features composed of one or more shape primitives. These features can be related, such as through relational database (RDBMS) indexes and database primary/secondary keys, to voxels. An RDBMS is one contemplated indexing tool and other indexing mechanisms can be used with the disclosure. When data elements are recorded in voxel space, a determination can be made as to whether each data element is to be referenced against a set of one or more voxels, against a defined feature, or both, as indicated by step 336.

In optional step 338, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 340, a voxel database space can be compacted to minimize storage requirements. Different voxel (e.g., raster-based) compaction algorithms can be utilized, which include loss-less compaction algorithms and lossy compaction algorithms.

Figure 3B:
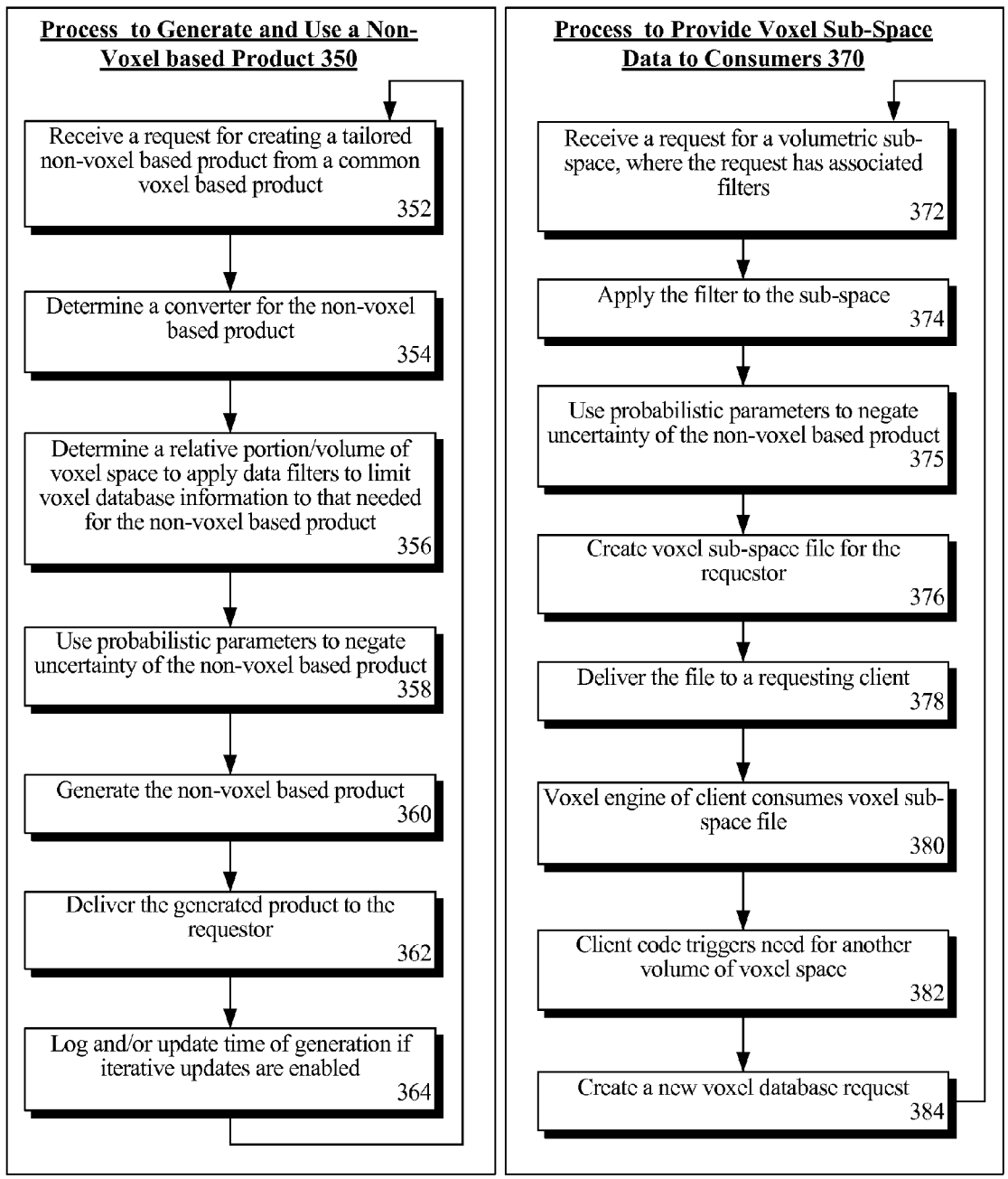
FIG. 3B is a set of flow charts for utilizing data of a voxel database in accordance with an embodiment of disclosure.

The voxel database populated through a process, such as process 310, can thereafter be treated as a common repository or centralized source for geospatially related information. This centralized source can be utilized by different consumers in different ways. In one scenario (process 350 shown in FIG. 3B), the voxel database can be used to generate a non-voxel based product, such as a SAF component. In another scenario (process 370 shown in FIG. 3B), the voxel database can provide voxel-subspace data sets to requestors, which these requestors can consume directly utilizing an internal voxel engine.

Process 350 can begin in step 352, where a request is received by a voxel database server. The request can be for creating a tailored non-voxel based product from a common voxel based product. An appropriate converter for the request can be determined in step 354.

In step 356, a relative portion or volume of voxel space needs to be determined. That is, the request will rarely be for an entire volume region stored by the voxel database, but will likely be for a volumetric subspace specifically needed by the non-voxel based product. Additionally, data within the requested volumetric subspace can be filtered by applied data filters, so that only the information needed for a specific product of the request is considered. In step 358, probabilistic parameters can be utilized to negate uncertainty inherent in the voxel database (in one embodiment) when generating the non-voxel based product. Different thresholds and/or parameters can be utilized to determine what level of uncertainty is to be retained within the non-voxel based product, which is generated in step 360. The generated product can be delivered to the requestor in step 362.

Some generated products can require periodic updates form the voxel database in order to retain information currency. In one embodiment, optimizations can be implemented so that only relatively new information needs to be considered for some update operations. When iterative updates are a concern, information can be logged and/or time attributes of the voxel database can be updated as appropriate, which is shown by step 364. The process 350 can repeat as needed, which is expressed by proceeding from step 364 to step 352.

Process 370 can begin in step 372, where a request for a volumetric sub-space is received. The request can have a set of associated filters. Unlike process 350, it is contemplated that a requestor of process 370 can directly consume voxel encoded information. In step 374, the filter can be applied to the voxel sub-space to conditionally exclude data of the voxel database. This is important as the voxel database can be a centralized repository that stores a myriad of data attributes in a voxel related manner, where only a subset of the data attributes are of concern for a specific requestor. In optional step 375, probabilistic parameters can be applied to negate uncertainty when generating the voxel sub-space. This optional step 375 can be utilized when satisfying a request (step 372) for a non-probabilistic voxel subspace.

In step 376, a file (or set of files) containing the requested information can be created. In step 378, the created file(s) can be delivered to a requesting client, such as by delivering the file(s) over a network. A voxel engine of the client can consume or utilize the voxel sub-space file, as shown by step 380. In one embodiment, the voxel database can be directly accessible and used by the clients, in which case a creation and utilization of a locally create file (of a voxel subspace) can be unnecessary.

In one embodiment, the voxel sub-space files can be encoded in a local media storage area (e.g., hard drive) for use by a client as needed. This prevents a need for continuous and/or stable network connectively between the client and the voxel database. In one embodiment, suitable voxel sub-space laden files can be encoded in a portable medium (e.g., optical, magnetic, or other) and disseminated/located to clients periodically.

In another embodiment, data sets can be continuously requested by a client such as when a SAF component needs a data set for a different volumetric space. That is, executing client code can trigger a need for another volume of voxel space, as shown by step 382. When no local cache exists for this needed information, a new voxel database request (submitted over a network) can be created, as shown by step 384, which results in the request being handled in step 372.

Figure 4:
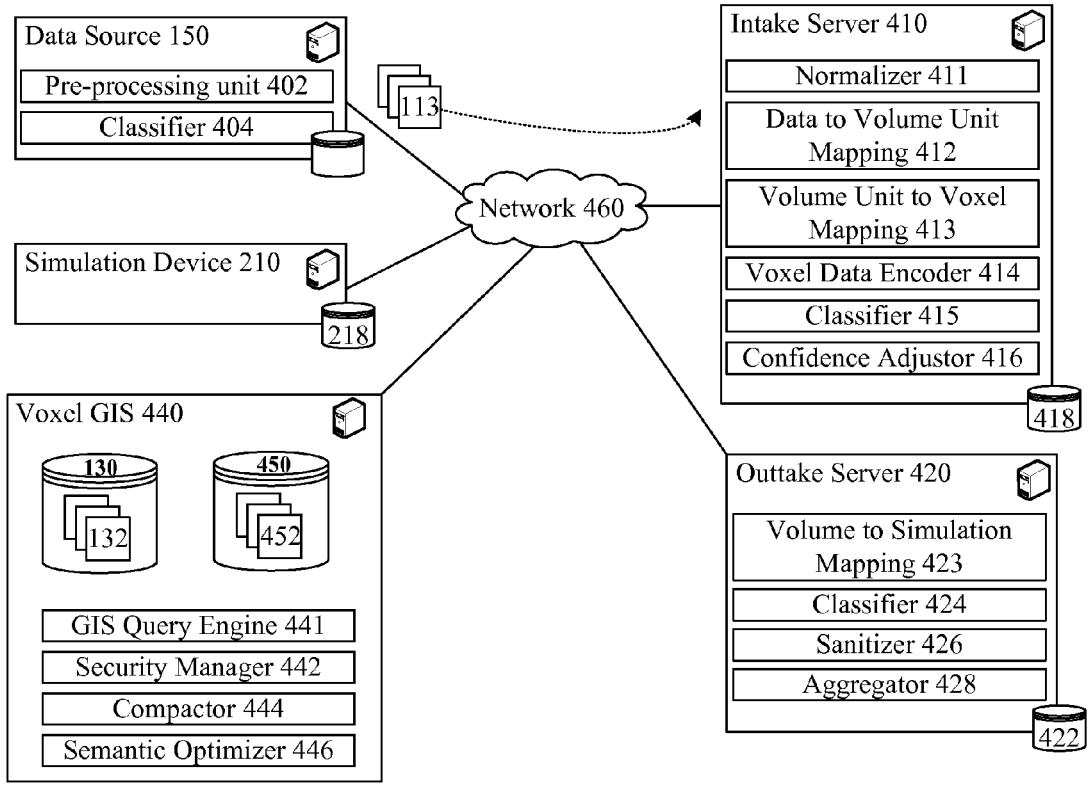
FIG. 4 is a schematic diagram of a system including a voxel database in accordance with an embodiment of disclosure.

FIG. 4 is a schematic diagram of a system 400 including a voxel database 130 in accordance with an embodiment of the inventive arrangements disclosed herein. In system 400, a set of data sources 150, a set of simulation devices 210, an intake server 410, an outtake server 420, a voxel geographic information system (GIS) 440, and other such components can be communicatively linked via a network 460. In lieu of connectivity via network 460, components of system 400 can exchange information via portable media data exchanges, paper document correspondences, human-to-human communications, and the like. The shown components (as items 150, 410, 420, 210, 440) represent one embodiment of the disclosure and are not to be construed as being a limitation of the disclosure's scope.

Various components of system 400, such as items 150, 410, 420, 210, 440, can include one or more computing devices 470, which can include hardware 480 and computer program products 490. The computing devices 470 can be general purpose computing devices, such as personal computers, servers, or in-vehicle computers. The devices 470 can also be special purposed devices specifically manufactured/constructed for a tailored purpose. A special purposed device can have unique hardware, electronic boards, firmware, etc, which is not able to be easily modified by software and used for a different purpose. In various embodiments, devices 470 can be implanted as stand-alone devices, as virtual devices, as distributed devices, as cooperative devices, and the like.

Hardware 480 can include a processor 482, nonvolatile memory 483, volatile memory 484, network transceiver 485, and other components linked via a bus 486. The computer program products 490 can include programmatic instructions that are digitally encoded in a memory (e.g., memory 483, 484) and able to be executed by the processor 482. Computer program products 490 include boot firmware 492, (e.g., basic input/output system (BIOS)), an optional operating system 493 (i.e., special purposed devices can be optimized so an operating system 493 is merged with applications 494 and/or modules 495), applications 494, and other executable modules 495. The operating system 493 can include mobile device operating systems, desktop operating systems, server operating system, virtual operating systems, and/or distributed operating systems.

Unlike many computing systems, system 400 can be a security sensitive one where data classifications are highly important. That is, information acquired from data sources 150, stored in voxel GIS 440, and used to drive simulation devices 210 can include unclassified, secret, top secret (including compartmentalizations) information. Classification components 404, 415, 424 can exist, which implement comprehensive and conservative rules to automatically classify information into appropriate classifications. Additionally, sanitizers (e.g., sanitizer 426) can be used in system 400 to downgrade semantic content (e.g., from secret to unclassified, for example) of conveyed data elements to ensure that classification based restrictions are not violated. Moreover, different network 460 channels and information handling standards can be imposed based on classification level of the information being conveyed. A further complication is that aggregating and/or analyzing data from different sources 150 can change a classification level of the base data. Automated mechanisms (i.e., classifier 424, aggregator 428, and/or voxel GIS 440, when aggregating data from multiple sources 150, can reevaluate and appropriately adjust resultant security classification levels) to conservatively handle data classifications are needed in system 400, especially in embodiments where data acquisition to model production (e.g., duration 162 of embodiment 160, for instance) is expedited.

The security sensitivity requirements can result in physically separate channels (e.g., within network 460, for example) for information conveyance. Further, storage regions for the different data classifications (e.g., within voxel GIS 440, for example) can remain isolated from each other. Known standards for handling classified information exist as do a myriad of automated techniques, which can be utilized for system 400. Various components (classifier 404, 414, 424, security manager 442, sanitizer 426) are shown in system 400 to express that system 400 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 400 are expected to vary from implementation-to-implementation. For example, discrete network 460 attached servers are shown for intake (intake server 410) and outtake (outtake server 420) of information to and from the voxel GIS 440. As shown, intake server 410 can perform intake processing operations (process 310, for example). Outtake server 420 can perform out taking processing operations (process 350 and/or 370, for example). In one embodiment, operations attributed to server 410 or 420 can be integrated into the voxel GIS 440 or other system 400 components (e.g., one or more intake server 410 operations can be performed by data source 150; one or more outtake server 420 operations can be performed by simulation device 210). For example, in one embodiment, pre-processing unit 402 can optionally perform operations described for normalizer 411 and/or data to volume unit mapping component 412.

Additional components not explicitly expressed in association with system 400, which are consistent with performing operations described in the disclosure, are to be considered present in system 400. Further, logical mappings from system 400 components to operations described herein are assumed to be present. For example, in various contemplated embodiments, compactor 444 can perform operations described in step 340 of FIG. 3A; semantic optimizer 446 can perform operations described in step 338 of FIG. 3A; and, confidence adjustor 416 can perform operations previously described in step 330 and 338.

Turning to voxel GIS 440, a number of characteristics should be noted. First, as new information for voxel GIS 440 is acquired (from data sources 150), a probability distribution of surface location and surface appearance can be dynamically and programmatically constructed (using Bayesian statistical learning algorithms, for example). In this sense, voxels of the GIS 440 do not store a fixed appearance (of volume units 112 from a real-world volumetric space 110) but instead store a dynamic probability of multiple appearances, which can be learned and/or refined over time.

This characteristic of GIS 440 not only permits efficient handling of uncertainty, but turns traditional data overload challenges into an advantage. That is, over time, information acquisition via satellites, SIGINT, and other automated sources has geometrically increased. Concurrently, a quantity of human analysts responsible for rapidly responding to acquired information has decreased and/or remained constant. In the past, different information channels or products from different sources 150 were handled in a stove-piped manner. Different human analysts would receive and/or analyze satellite data, SIGINT data, HUMINT data, and the like. One result of this situation is that collected data is often not be analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The voxel GIS 440 is a central component for this needed paradigm shift.

Figure 5:
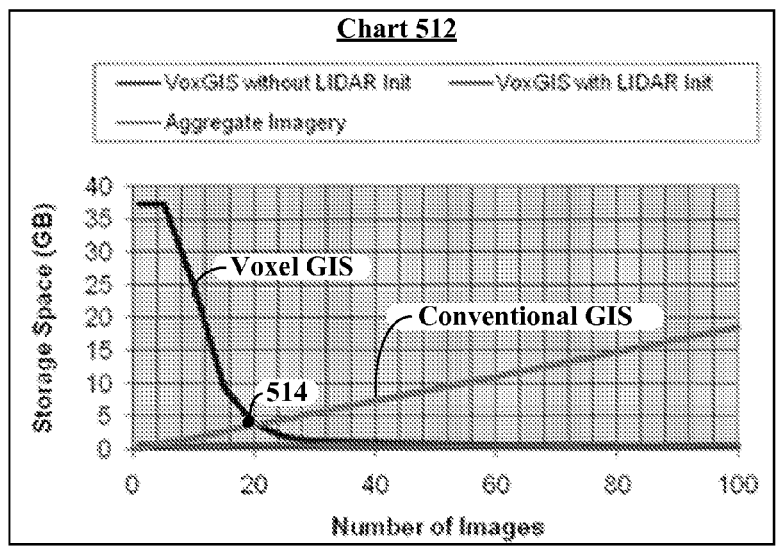
FIG. 5 demonstrates a relationship between voxels, shapes, and features in accordance with an embodiment of disclosure.
Figure 5:
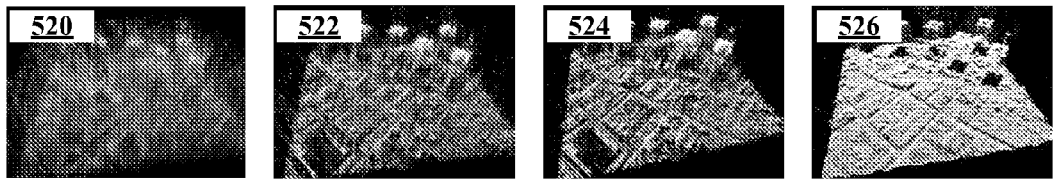
Figure 5:
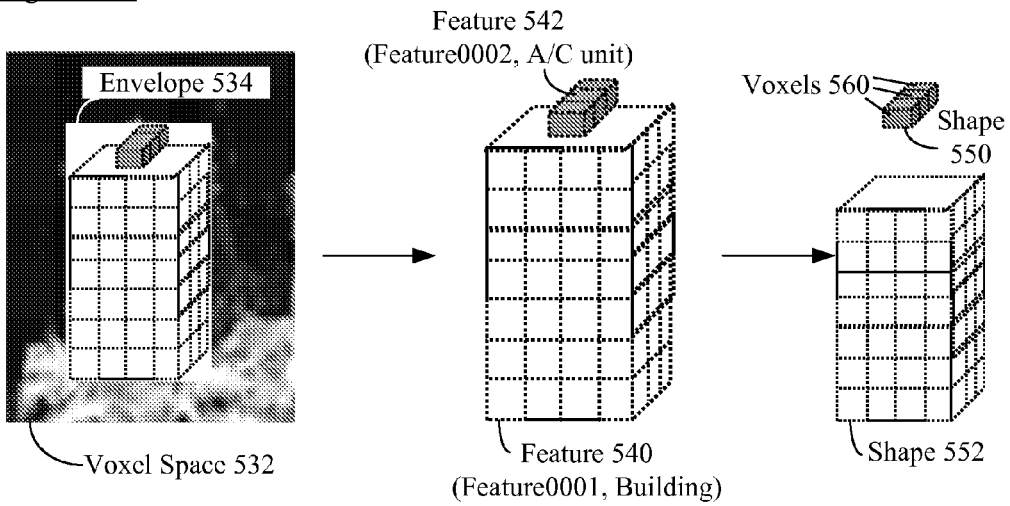

To elaborate using diagram 510 in FIG. 5, Voxel GIS 440 is able to efficiently aggregate information. This aggregation efficiency actually accelerates as information density increases. For example, as a number of images encoded within GIS increases, Voxel GIS 440 storage requirements can actually decrease (or at least become more efficient than the straight line increase experienced using a traditional GIS). Aggregation efficiency results from the "holographic-like" nature of volumetric storage space, where an increase in information density increases clarity of the voxel space 120. Uncertainty is reduced, which can reduce storage requirements (e.g., decreasing overhead needed for maintaining "noise" or abnormal data points in voxel space 120).

Aggregation efficiency of the Voxel GIS 440 is represented in diagram 510 by a set of images 520-526 of a stored voxel space. The images 520-526 are static geospatial images of real-world terrain taken from satellite images, yet the demonstrated principle is consistent regardless of the specific input being encoded in voxel space. For example, as more information is captured for individuals in a population, social characteristics of the population become increasingly refined.

Image 520 shows a visual depiction of a voxel space formed from ten images. Image 522 shows the same voxel space after 20 images have been processed. Image 524 shows the voxel space after 30 images. Image 526 shows same voxel space, that has been refined using LIDAR points in conjunction with the thirty images. As shown, it becomes evident that an increase in information density decreases uncertainty of an encoded voxel space and increases "fidelity" of the stored information. That is, as information density increases surface probabilities become better defined. More voxels (and associated data) in "empty space" can be discarded.

It can be mathematically shown that as information density approaches infinity, storage space requirements for the Voxel GIS 440 approaches (effectively equals) a theoretical minimal storage space required by the imagery (and/or data elements being stored). At relatively low information densities (compared to that currently being handled by intelligence agencies) a cross-over point 514 occurs, where it is more efficient to store equivalent data within a Voxel GIS 440 than it is to store equivalent data in a non-voxel GIS (e.g., a conventional GIS). Post cross-over point 514 voxel GIS 440 storage space advantages continue to increase, as shown by chart 512. It should be noted that although many examples presented herein are in context of intelligence activities, Voxel GIS 440 aggregation efficiencies and techniques are domain independent can be used for any geospatial data set.

In voxel database 440 information can be indexed against voxels in different manners. In one embodiment, some records 132 can be directly indexed against uniquely identified voxels (in voxel database 130, for example). Other records 452 can be indexed against features, which are stored in a feature data base 450. Cross indexing between voxel database 130 and feature database 450 can occur.

A feature can be a representation of an object in a physical world (or a simulated object) having its own unique identity and characteristics. Buildings, trees, highways, rivers, lakes, and the like are examples of features. A volume in voxel space 120 occupied by a feature can be defined by a volumetric envelope. The volumetric envelope can be composed of one or more shape primitives. Shape primitives can be a set of basic volumetric shapes that are easily defined by a relatively small number of numeric parameters.

When features and voxel references are both stored in the voxel GIS 440, different consistent semantic mappings can be utilized. In one embodiment, voxel-level semantic content 456 can include spectral signature attributes (e.g., Multispectral Imaging (MSI), Hyperspectral Imaging (HSI), etc.), visual attributes (relating to a human's sense of sight), olfaction attributes (relating to a human's sense of smell), audition attributes (relating to a human's sense of hearing), gustation attributes (relating to a human's sense of taste), somatosensory attributes (relating to a humans sense of touch, temperature, proprioception, and nociception), material composition attributes, and the like.

Diagram 530 provides an illustrated example for describing features. In diagram 530, an envelope 534 of a voxel space 532 can contain features 540 and 542. Feature 540 can be uniquely identified as Feature0001, which is a feature identifier. The feature type of Feature 540 can be a building. Feature 542 can be an air conditioning unit positioned on top of the building. As shown, each feature 540, 542 is formed from single shape primitives 550 and 552, which are both boxes. Features can include any number (from 1 to N) of shape primitives. Each shape can include (be mapped to) a set of voxels. For example, three voxels 560 can form shape 550. In one embodiment, the voxel GIS 340 can include software implemented tools to automatically detect and define shapes, features, and envelopes in a given voxel space.

While any number of shape primitives can be supported by system 400, some common shape primitives include boxes, cylinders, spheres, and cones.

In one embodiment, shape primitives used by system 400 can conform to existing standards for enhanced compatibility. For example, shape primitives can conform to Open Graphics Library (OpenGL) standards for 3D computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cone equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cone can have no equivalent. In still another embodiment, mappings to a computer aided design (CAD) scheme can be as follows: a box equates to an Axis Aligned Bounding Box (AABB); a cylinder equates to a Cylinder, Flat Ends; and, a sphere equates to a Cylinder, Round Ends, Zero Length.

In one embodiment, the GIS query engine 441 of the Voxel GIS 440 can perform seamless and user transparent queries across the different databases 130, 450. It should be noted, that although being referred to as different databases 130, 450 a single unified database (or other indexed repository) can be utilized in the disclosure for both voxel-indexed records 132 and feature indexed records 452.

FIG. 6 illustrates a set of tables 610, 620, 630, 640 for a voxel GIS in accordance with an embodiment of the disclosure. In one embodiment, the tables 610, 620, 630, 640 can be RDBMS tables in third normal form. The tables 610, 620, 630, 640 can include a plurality of records (e.g., records 132 and 452).

Voxel table 610 includes a VID 612, which is a unique identifier for each voxel. SID 613 can be a unique identifier for a shape primitive which forms all or part of a shape envelope. Any quantity (1 . . . N) of attributes can be associated with each unique voxel of table 610. For example, each detailed semantic content element can have an associated attribute 614, 616. In one embodiment, each attribute 614, 616 in the voxel table 610 can have at least two values, such as a lower value and an upper value. The multiple values can be used to record different levels of certainty for each attribute 614, 616. For example, one source can report a first value of an attribute 614, 616 with a definable degree of certainty and a different value can be reported for the same attribute 614, 616 with a different degree of certainty. Although two values (lower and upper) are shown for each attribute 614, 616, any number of values (1 . . . N) can be used in table 610.

Each record in shape table 620 can includes a unique shape identifier, SID 622. A secondary key for a feature ID 624 can also be included. Table 620 can also include a type 626 attribute. A set (0 . . . N) of additional shape specific attributes 628 can also exist.

Each unique feature can be associated with a feature identifier, FID 632. In one implementation, different types of tables 630, 640 can exist, one for each unique category or type of object, which corresponds to a feature. For example, one table 630 can exist for buildings and another table 640 can exist for tree groves. Each table 630, 640 can have an associated set of attributes 634, 644, which are unique to a specific type of object. It should be appreciated that arrangements of tables 610, 620, 630, 640 are presented to illustrate a concept expressed herein and are not to be construed as a limitation of the disclosure.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing geospatial data to a plurality of applications comprising:

populating a voxel database with geospatial information specific to a real-world volumetric space, the voxel database representing a volumetric storage space comprising a set of unique volumetric storage units called voxels, wherein data elements are stored to specific ones of the voxels, wherein a spatial position of the data elements within the volumetric storage space is defined at least in part by which of the voxels the data elements are stored;

receiving information requests having different formats for different applications;

for each information request:
identifying a volumetric sub-region of the volumetric storage space for the information request;
receiving a set of data elements from the voxel database for the volumetric sub-region, where the set of data elements satisfy the information request;
detecting a set of objects contained in the volumetric sub-region and detailed in raster format within the data elements, wherein the set of objects are not specifically delineated as discrete objects within the voxel database, wherein a spatial position of each of the set of objects is determined based at least in part upon spatial information of applicable ones of the voxels; and
producing a response data set comprising the set of objects and the spatial position of each object in the set of objects, wherein the response data set is produced in the one of the different formats appropriate for the one of the different applications for which the information request was issued, wherein the response data set comprises geospatially correlated information needed by one of the different applications to represent a simulation space within a user interface of that one of the different applications, wherein the simulation space corresponds to a volume of the real-world volumetric space that is associated with the volumetric sub-region of the volumetric storage space.

2. The method of claim 1, wherein one of the plurality of different applications is a live simulation application, wherein another of the different applications is a virtual simulation application, and wherein another of the different applications is a constructive simulation application.

3. The method of claim 1, wherein at least one of the different applications is a voxel-based application where the response data set received by the voxel-based application is in a voxel format, wherein according to the voxel format, content is indexed against uniquely identified volumetric units and where a visual interface of the voxel-based application is rendered by a voxel graphics engine, and wherein at least one of the different applications is a vector-based application where the converted data set received by the vector-based application is in vector format, wherein according to the vector format, content is indexed against discrete and uniquely identified objects having a set of points, each of which is defined by a three-dimension coordinate and where a visual interface of the vector-based application is rendered by a polygon graphics engine.

4. The method of claim 1, wherein one of the different applications is a semi-autonomous force (SAF) simulation application, wherein one of the different applications is a tactical engagement system (TES) simulation application, and wherein one of the different applications is an immersion simulation application.

5. The method of claim 1, wherein for one of the different applications the response data set is used by an application that is a stand-alone product that lacks runtime connectivity to the voxel database.

6. The method of claim 1, wherein for one of the different application, a plurality of different ones of the response data set is periodically provided to the application at runtime, where each response data set of the plurality that is provided to and used by the application represents a specific and non-overlapping geospatial region of simulator space.

7. The method of claim 1, wherein for one of the different applications the response data set is continuously provided as a stream of data conveyed between the application and the voxel database in real-time, where the stream of data is used at least in part to dynamically generate terrain for a user interface of the application.

8. The method of claim 1, wherein the populating of the voxel database further comprises:
storing and combining geospatial information captured from real-world sensors in the voxel database, such that each voxel in the voxel database represents a combination of volumetrically stored geospatial information available for that volume of volumetric storage space.

9. The method of claim 8, wherein the geospatial information that is stored and combined into the voxel database comprise point cloud data, imagery and video data, and elevation data, wherein the point cloud data is encoded in a light detecting and ranging (LiDAR) information format, wherein the elevation data is encoded in a digital elevation model (DEM) or digital surface model (DSM) format.

10. The method of claim 1, further comprising:
a plurality of sensors capturing raw data that geospatially corresponds to a real world volumetric space, wherein the raw data comprises point cloud data encoded in a light detecting and ranging (LiDAR) information format, comprises imagery and video data, and comprises elevation data encoded in a digital elevation model (DEM) or digital surface model (DSM) format;
storing and combining the raw data in the voxel database such that each voxel in the voxel database represents a combination of volumetrically stored data for all source products that includes products providing point cloud data, imagery and video data, and elevation data;
the voxel database receiving the information requests from a plurality of different applications;
for each of the different applications associated with one of the information requests request:
determining an application specific plug-in;
executing the application specific plug-in to convert the voxel database data into an application specific format; and
providing the voxel database data to the application from which the request was issued.

11. A computer program product for providing geospatial data to a plurality of applications, the computer program product comprising: a tangible non-transitory computer readable storage medium having computer usable program code embodied therewith, the computer usable program code comprising: computer usable program code operable to populate a voxel database with geospatial information specific to a real-world volumetric space, the voxel database representing a volumetric storage space comprising a set of unique volumetric storage units called voxels, wherein data elements are stored to specific ones of the voxels, wherein a spatial position of the data elements within the volumetric storage space is defined at least in part by which of the voxels the data elements are stored;
computer usable program code operable to receive information requests having different formats for different applications;
computer usable program code operable to, for each information request: identify a volumetric sub-region of the volumetric storage space for the information request;
receive a set of data elements from the voxel database for the volumetric sub-region, where the set of data elements satisfy the information request;
detect a set of objects contained in the volumetric sub-region and detailed in raster format within the data elements, wherein the set of objects are not specifically delineated as discrete objects within the voxel database, wherein a spatial position of each of the set of objects is determined based at least in part upon spatial information of applicable ones of the voxels; and
produce a response data set comprising the set of objects and the spatial position of each object in the set of objects, wherein the response data set is produced in the one of the different formats appropriate for the one of the different applications for which the information request was issued, wherein the response data set comprises geospatially correlated information needed by one of the different applications to represent a simulation space within a user interface of that one of the different applications, wherein the simulation space corresponds to a volume of the real-world volumetric space that is associated with the volumetric sub-region of the volumetric storage space.

12. A system for managing geospatial data used by a plurality of applications comprising: populating a voxel database with geospatial information specific to a real-world volumetric space, the voxel database representing a volumetric storage space comprising a set of unique volumetric storage units called voxels, wherein data elements are stored to specific ones of the voxels, wherein a spatial position of the data elements within the volumetric storage space is defined at least in part by which of the voxels the data elements are stored;

receiving information requests having different formats for different applications; for each information request: identifying a volumetric sub-region of the volumetric storage space for the information request;

receiving a set of data elements from the voxel database for the volumetric sub-region, where the set of data elements satisfy the information request;

detecting a set of objects contained in the volumetric sub-region and detailed in raster format within the data elements, wherein the set of objects are not specifically delineated as discrete objects within the voxel database, wherein a spatial position of each of the set of objects is determined based at least in part upon spatial information of applicable ones of the voxels; and producing a response data set comprising the set of objects and the spatial position of each object in the set of objects, wherein the response data set is produced in the one of the different formats appropriate for the one of the different applications for which the information request was issued, wherein the response data set comprises geospatially correlated information needed by one of the different applications to represent a simulation space within a user interface of that one of the different applications, wherein the simulation space corresponds to a volume of the real-world volumetric space that is associated with the volumetric sub-region of the volumetric storage space.

13. The system of claim 12, wherein one of the plurality of applications is a live simulator application, wherein another of the different applications is a virtual simulator application, and wherein another of the applications is a constructive simulator application.

14. The system of claim 12, wherein one of the applications is a semi-autonomous force (SAF) simulator application, wherein one of the different applications is a tactical engagement system (TES) simulator application, and wherein one of the different applications is an immersion simulator application.

15. The system of claim 12, wherein at least one of the applications is a voxel-based application where the converted data set received by the voxel-based application is in voxel format, where content is indexed against uniquely identified volumetric units and where a visual interface of the voxel-based application is rendered by a voxel graphics engine, and wherein at least one of the different applications is a vector-based application where the converted data set received by the vector-based application is in vector format, where content is indexed against discrete and uniquely identified objects having a set of points, each of which is defined by a three-dimension coordinate and where a visual interface of the vector-based application is rendered by a polygon graphics engine.

16. The system of claim 12, wherein one of the application receives a live stream of terrain data from the voxel database in real time, wherein another one of the applications receives iterative updates from the voxel database as needed where each update is for a non-overlapping geospatial region of simulation space that corresponds to a real-world geospatial region, and wherein one of the application is a stand-alone product that lacks runtime connectivity to the voxel database.

17. The system of claim 12, wherein each voxel of the voxel database comprises data combined from a plurality of different discrete products such that each voxel in the voxel database represents a combination of volumetrically stored data for all of the different discrete products, said different discrete products comprising point cloud products comprising point cloud data encoded in a light detecting and ranging (LiDAR) information format, imagery products comprising imagery and video data, and comprising elevation products comprising elevation data encoded in a digital elevation model (DEM) or digital surface model (DSM) format.

18. The system of claim 12, wherein the voxel database stores high fidelity content of terrain having a six inch or smaller ground separation distance between datum points, wherein the density of data in the voxel database has reached a cross-over point, where it is more efficient to store equivalent data within the voxel database than it is to store equivalent data in a non-voxel geospatial database.

19. The system of claim 12, wherein the voxel database comprises a heterogeneous database for internal storing of different semantic content in different manners, which are transparent to external entities that view the voxel database as a single unified database having a consistent externally facing interface.

20. The system of claim 12, further comprising:
a voxel server for managing data of the voxel database and for supporting the plurality of application from the data encoded in the voxel database; and
a plurality of application plug-ins each for a specific one of the applications, wherein said voxel server using said application plug-ins is operable to provide related ones of the applications with real-time streaming of terrain models based on voxel database encoded geospatial content.

21. The system of claim 20, wherein said voxel server further comprises:
a terrain manager for providing a unified external interface for receiving and responding to information requests; and
a compression engine for compressing voxel database stored data comprising semantic content from elevation products, imagery products, and point cloud products; and
a voxel query engine for providing a unified and consistent way to accept and respond to structured queries.

22. The system of claim 12, wherein said voxel database comprises:
a plurality of voxel records in a voxel table, where each of the records has a unique voxel identifier, wherein said voxel table is stored in a tangible storage medium; and
a plurality of feature records in a plurality of feature tables, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and
a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the voxel table comprises a foreign key to a shape identifier, wherein a one-to-many relationship exists between voxels and primitive shapes.

* * * * *